United States Patent [19]

Blizzard et al.

[11] Patent Number: 5,086,103

[45] Date of Patent: Feb. 4, 1992

[54] PRESSURE-SENSITIVE COMPOSITION CONTAINING AN AMINOXYSILICON COMPOUND

[75] Inventors: John D. Blizzard; Terence J. Swihart, both of Bay County, Mich.

[73] Assignee: Dow Corning Corporation, Midland, Mich.

[21] Appl. No.: 513,727

[22] Filed: Apr. 24, 1990

Related U.S. Application Data

[62] Division of Ser. No. 303,783, Jan. 30, 1989, abandoned.

[51] Int. Cl.$^5$ .......................... C08K 5/54; C09J 11/06; C09J 11/08
[52] U.S. Cl. ................................ 524/188; 524/262; 524/265; 524/269
[58] Field of Search ............... 525/100, 102, 104, 105, 525/106, 452; 524/188, 262, 265, 267, 269

[56] References Cited

U.S. PATENT DOCUMENTS

| | | | |
|---|---|---|---|
| 3,441,583 | 4/1969 | Murphy | 260/448.2 |
| 3,644,245 | 2/1972 | Flanagan | 260/23 |
| 3,657,279 | 4/1972 | Hilbelink et al. | 260/824 R |
| 3,707,518 | 12/1972 | Bemmels et al. | 260/29.6 |
| 3,817,909 | 6/1974 | Toporcer et al. | 260/37 SB |
| 4,126,504 | 11/1978 | Wolinski et al. | 156/310 |
| 4,151,319 | 4/1979 | Sackoff et al. | 428/40 |
| 4,346,189 | 8/1982 | Laurent | 524/267 |
| 4,423,095 | 12/1983 | Blizzard | 427/387 |
| 4,463,115 | 7/1984 | Hirose et al. | 524/188 |
| 4,500,584 | 2/1985 | Modic | 428/145 |
| 4,581,281 | 4/1986 | Gerace | 428/215 |
| 4,593,068 | 6/1986 | Hirose et al. | 525/100 |
| 4,623,693 | 11/1986 | Inoue et al. | 524/700 |
| 4,665,127 | 5/1987 | Hirose et al. | 33/525 |
| 4,693,935 | 9/1987 | Mazurek | 428/352 |
| 4,810,748 | 3/1989 | Spells | 524/725 |
| 4,975,488 | 12/1990 | Furukawa et al. | 515/100 |

FOREIGN PATENT DOCUMENTS 8703477 6/1987 World Int. Prop. O. .

Primary Examiner—Joseph L. Schofer
Assistant Examiner—R. H. Delmendo
Attorney, Agent, or Firm—Alexander Weitz

[57] ABSTRACT

The invention relates to a method of contacting two components to form a pressure-sensitive adhesive (PSA) construction, wherein the first component comprises a conventional PSA and an aminoxysilicon compound and a second component comprises the same PSA and an amidosilicon compound. The method provides improved adhesive bond strength over an unmodified PSA construction.

4 Claims, No Drawings

PRESSURE-SENSITIVE COMPOSITION CONTAINING AN AMINOXYSILICON COMPOUND

This is a divisional of copending application(s) Ser. No. 07/303,783 filed on 1-30-89, now abandoned.

The present invention relates to crosslinkable pressure-sensitive adhesives and an improved method for forming a pressure-sensitive adhesive construction. More particularly, the present invention relates to a method of contacting two distinct pressure-sensitive adhesive components to form the construction, wherein an aminoxysilicon compound is incorporated in the first component and an amidosilicon compound is incorporated in the second component.

BACKGROUND OF THE INVENTION

It is well known in the adhesives art that significant improvement in adhesion to various substrates can be obtained by incorporating various adhesion promoters into adhesive compositions or employing such adhesion promoters in primer compositions for coating the substrate. Development of a wideranging adhesives art has benefited from this method of adhesion improvement and various organosilanes have been typically employed as the adhesion promoter.

Organosilanes which are useful in these applications generally contain hydrolyzable groups (e.g., halogen, alkoxy) attached to the silicon atom thereof which generate silanol groups upon contact with ambient moisture, and thus readily form chemical and/or physical bonds with mineral and metal surfaces. Also attached to the silicon of the organosilane adhesion promoter is an organic moiety which is reactive with, or at least shows some affinity towards, one of the components of the adhesive (usually the polymer). This latter requirement usually limits the practical utility of a specific organosilane to particular adhesive-substrate combinations. In this way, a chemical or physical "molecular bridge" is believed to be formed between the adhesive and the substrate which results in the observed macroscopic improvement in adhesion.

Thus, for example, U.S. Pat. No. 3,644,245 to Flanagan et al. discloses hot melt adhesive compositions having improved adhesion under conditions of high humidity. These compositions comprise a synthetic polymer base and hydrolyzable silanes containing such organic groups as phenyl, vinyl, epoxy, mercapto, amino, ethyl, methyl and methacryloxypropyl.

Additionally, the adhesion to a substrate, as well as the cohesive strength of an adhesive composition, may be augmented by at least partially cross-linking the adhesive. Various examples of this method exist in the art, which method is illustrated by U.S. Pat. No. 3,657,379 to Hilbelink et al. This disclosure teaches adhesive systems comprising separated reactive components wherein (1) a first reactive polymer is mixed with a curing agent for a second reactive polymer to yield one component and (2) a second reactive polymer is mixed with a curing agent for the first reactive polymer to form another component. When the reactive materials from the two components are mixed, the curing agents react with their respective reactive polymers to give strong adhesive bonds.

A distinct category of adhesives which comprises natural or synthetic rubbers and resin tackifiers is known in the art as "pressure-sensitive adhesives" (PSAs). PSAs uniquely maintain a permanent "tack" which provides a bond of measurable strength immediately upon contact with another surface. Again, adhesion to a substrate, as well as the cohesive strength of the PSA composition itself, can be improved by curing the PSA.

A cured PSA based on a polyether having at least one silicon-containing hydrolyzable group in its molecule is disclosed by Hirose et al. in U.S. Pat. No. 4,463,115. This composition also contains a tackifier and, optionally, a silanol condensation catalyst for accelerating the curing reaction. It is stated that the resulting PSA has good adhesive properties and can be prepared substantially without the use of a solvent.

In a subsequent U.S. Pat. No. 4,665,127, Hirose et al. extended the above concept to include a wide variety of polymers having at least one reactive silicon-containing group combined with an organic aluminum or organic zirconium catalyst. These PSA compositions are said to have excellent heat resistance and releasability from substrates such as a silicone-coated release paper.

In U.S. Pat. No. 3,707,518, Bemmels et al. disclose a self cross-linking pressure-sensitive acrylate adhesive and tape which comprises a copolymer that includes a small amount of an alkoxy silyl polymerizable crosslinking monomer. Also included in these compositions is 2-6 parts by weight of an acid monomer which acts as a built-in catalyst and causes the adhesive copolymer to cure at ordinary temperatures.

Aside from silicone-based PSAs, the use of silanes as adhesion promoters or compositions wherein reactive silicon groups are chemically attached to organic molecules to promote cure therebetween, silicones are generally known in the art to be abhesive materials (i.e., they impart good release of adhesives) and have, indeed, been widely employed in release liners for pressure-sensitive tape. Surprisingly, as disclosed in three copending applications (Ser. No. 181,763, filed on Apr. 14, 1988, now U.S. Pat. No. 5,037,886; Ser. No. 189,004, filed on May 2, 1988, now U.S. Pat. No. 4,831,080; and Ser. No. 216,609, filed on July 8, 1988, now U.S. Pat. No. 4,906,695), Blizzard and Swihart discovered a method for contacting two components to form a pressure-sensitive adhesive (PSA) construction, wherein the first component comprises a conventional PSA and a reactive organopolysiloxane and the second component comprises the PSA and a cure agent for the organopolysiloxane. The method provides improved adhesion, which generally increases with the passage of time, over the unmodified PSA.

SUMMARY OF THE INVENTION

It has now been further discovered that certain aminoxysilicon compounds and amidosilanes may also be employed according to the methods described by Blizzard and Swihart, cited supra. The present invention, therefore, relates to a method for forming a crosslinkable pressure-sensitive adhesive construction comprising contacting a first component comprising (I) a pressure-sensitive adhesive; and
(II) an aminoxysilicon compound having from 1 to 100 silicon atoms per molecule, from 3 to 10 aminoxy groups per molecule and at least one radical selected from the group consisting of monovalent hydrocarbon radicals and halogenated monovalent hydrocarbon radicals per silicon atom, said aminoxy group having a general formula -OX, wherein X is selected from the group consisting of -NR$_2$ and a heterocyclic amine, R being a monovalent hydrocarbon radical, with a second component comprising (III) a further portion of said pressure-sensitive adhesive; and (IV) an amidosilicon compound selected from the group consisting of (a) a polymer consisting essentially of siloxane units selected from the group consisting of alkylmethylsiloxane units having 1 to 8 carbon atoms in the alkyl radical thereof and phenylmethylsiloxane units, said polymer having at least two amido groups of the formula

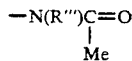

in its molecule, wherein R''' represents an organic radical selected from the group consisting of methyl, ethyl and phenyl and Me denotes a methyl radical, and (b) an amidosilane having the general formula

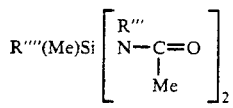

wherein R'''' is an organic radical selected from the group consisting of methyl, vinyl and phenyl and R''' and Me have been previously defined.

This invention further relates to compositions comprising the pressure-sensitive adhesive and the aminoxysilicon compound, and to compositions comprising the pressure-sensitive adhesive and the amidosilicon compound, employed in the above described method.

DETAILED DESCRIPTION OF THE INVENTION

In the method of the present invention, a first component comprising (I) a pressure-sensitive adhesive (PSA) and (II) an aminoxysilicon compound is contacted with a second component comprising (III) the same pressure-sensitive adhesive and (IV) an amidosilicon compound to form a PSA construction. While not wishing to be bound by any particular mechanism, it is believed that after the PSA construction is formed, the aminoxysilicon compound and the amidosilicon compound interact with atmospheric moisture to provide a "permanent set" to the adhesive system. Permanent set, as used herein, refers to the irreversible increase with time of the adhesive bond between the first and second components. This interaction can, of course, be hastened at elevated temperatures. The individual components, however, may generally be stored for prolonged periods under ambient conditions (e.g., room temperature and less than 50% relative humidity) as long as they are not in contact with each other.

As far as is known, the exact nature of the pressure-sensitive adhesive (I) employed in the method and composition of the present invention is not critical to operability. The only limitation to this general operability is that the PSA have a reasonable degree of compatibility with the aminoxysilicon compound (II) and the amidosilicon compound (IV), each described infra. By compatibility it is meant that the PSA components are not subject to phase separation upon standing and remain as homogeneous dispersions or solutions. Thus, it is believed that any of the PSAs known in the art will function satisfactorily herein. These PSAs are based on a natural or synthetic rubber which has been mixed with a tackifier resin and, optionally, with various fillers, plasticizers, extender oils, catalysts, preservatives, antioxidants, stabilizers, or other ingredient normally employed in the preparation of PSAs. The PSAs suitable for use in the methods and compositions of the present invention may be based on natural rubber and/or one or more synthetic rubber such as butyl, silicone, acrylic, styrene-butadiene, acrylonitrile-butadiene, polyisobutylene, isoprene, isopreneisobutylene, chloroprene, polyvinylether, chlorinated and polyurethane rubbers, and the like. Typical resin tackifiers used in conjunction with these rubbers include rosin, hydrocarbon resins, terpene resin, siloxane resin and the like. Particularly preferred PSAs include those based on styrene-butadiene and acrylic polymers.

The pressure-sensitive adhesives of ingredient (I) are well known in the art and further description thereof is considered unnecessary. Many of these materials are available commercially.

Ingredient (II) of the present invention is an aminoxysilicon compound having from 1 to 100 silicon atoms per molecule in which there are from 3 to 10 aminoxy groups per molecule and at least one monovalent hydrocarbon radical or halogenated monovalent hydrocarbon radical per silicon atom. The aminoxysilicon compound can be a silane or a siloxane. The aminoxy group which is bonded to the silicon atoms through silicon-oxygen bonds can be represented by the general formula -OX wherein X is a monovalent amine radical selected from the group consisting of -NR$_2$, in which R represents a monovalent hydrocarbon radical, and a heterocyclic amine. Specific examples of the -NR$_2$ groups include N,N-diethylamino, N,N-ethylmethylamino, N,N-dimethylamino, N,N-diisopropylamino, N,N-dipropylamino, N,N-dibutylamino, N,N-dipentylamino, N,N-dihexylamino, N,N-dicyclohexylamin, N,N-methylpropylamino, N,N-methylbutylamino, N,N-diphenylamino, N,N-ditolylamino, N,N-methylphenylamino and N,N-methylnaphthylamino. The heterocyclic amines can be illustrated by such groups as ethylenimino, pyrrolidino, piperidino and morpholino.

When the aminoxysilicon compound has one silicon atom, it may be represented by the general formula R'Si(OX)$_3$, in which R' can be a monovalent hydrocarbon radical or halogenated monovalent hydrocarbon radical. R' can be illustrated by methyl, ethyl, phenyl, vinyl, hexyl, octadecyl, cyclohexyl, butyl, heptyl, octyl, benxyl, phenylethyl, naphthyl, propyl, isopropyl, chlorophenyl, 3,3,3-trifluoropropyl, beta-(perfluoropentyl) ethyl, iodonaphthyl, bromoheptyl, and the like.

The aminoxysilicon compounds which have more than one silicon atom per molecule can be linear polysiloxanes and cyclic polysiloxanes. They can be homopolymers, copolymers or mixtures of the siloxanes as well as mixtures of the siloxanes and silanes. The silicon atoms of the siloxanes are linked together through silicon-oxygen-silicon bonds, with the remaining valences of the silicon atoms not bonded to aminoxy groups being bonded to monovalent radicals as defined by R' above. These aminoxy siloxanes can be illustrated by the aminoxysilicon compounds described in U.S. Pat. No. 3,817,909 to Toporcer et al., assigned to the assignee of the present invention and hereby incorporated by reference.

It is preferred that the aminoxysilicon compound be selected from copolymers of polydimethylsiloxane having the general structure

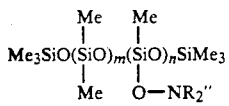
(i)

wherein Me hereinafter denotes a methyl radical and R" is independently selected from methyl or ethyl radicals. In the above formula, the value of m may range from 1 to about 5,000, preferably from 1 to 100, while n may be 2 to about 50, preferably from 2 to 10. A highly preferred aminoxysilicon compound has the average structure

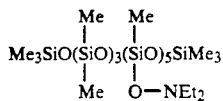
(ii)

in which Et hereinafter denotes an ethyl radical.

The aminoxysilicon compounds of the present invention are known in the art and can be prepared by the method shown in U.S. Pat. No. 3,441,583.

Ingredient (III) of the present invention is a further portion of the same PSA as ingredient (I).

The amidosilicon compound (IV) may be selected from homopolymers or copolymers consisting essentially of alkylmethylsiloxane units or phenylmethylsiloxane units. The alkyl radical of the alkylmethylsiloxane units may contain from 1 to 8 carbon atoms, but it is preferred that the alkyl group is also a methyl radical. For the purposes of the present invention, at least two amido groups must be present on each polymer or copolymer molecule. The amido groups may be attached to main-chain silicon atoms or to terminal silicon atoms and has the general structure

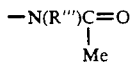

in which R''' represents an organic radical selected from the group consisting of methyl, ethyl and phenyl. As discussed above ingredient (IV) must form a compatible system when mixed with the pressure-sensitive adhesive (III). Therefore, the degree of polymerization of the polymer or copolymer containing amido groups may not exceed a value consistent with this requirement. An example of such a homopolymer is represented by the formula

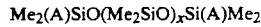

in which A denotes the group

and x is of such a value that the polymer is compatible with the particular PSA under consideration.

Alternatively, it is preferred that the amidosilicon compound is selected from amidosilanes having the general formula

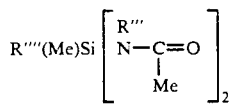

wherein R'''' represents an organic radical selected from the group consisting of methyl, vinyl and phenyl and R''' has its previous definition. The silanes include, for example, methyvinyldi-(N-methylacetamido) silane, dimethyldi-(N-methylacetamido) silane, methylphenyl-di-(N-methylacetamido) silane, methylvinyldi-(N-ethylacetamido) silane, dimethyldi-(N-ethylacetamido) silane, methylphenyldi-(N-ethylacetamido) silane, methylvinyldi-(N-phenylacetamido) silane, dimethyldi-(N-phenylacetamido) silane, and methylphenyldi(N-phenylacetamido) silane. A preferred amidosilicon compound of the present invention is methylvinyldi-(N-methylacetamido) silane.

The amidosilanes are well known in the art and can be prepared by reacting a cholorosilane with an alkali metal salt of an appropriate N-organoacetamide. The polymers containing the amido groups may, in turn, be prepared from the amidosilane by reacting an excess of this compound with a silanol-functional siloxane polymer, the polymer being added to the amidosilane to produce the product.

Although the above described aminoxysilicon compounds and amidosilanes may generally be employed in the method of the present invention, it has been found that certain PSAs are themselves incompatible with some of these compounds. The skilled artisan will readily determine which of these compounds are compatible with a given PSA.

The compositions of this invention can further comprise typical adjuvants employed in the preparation of pressure sensitive adhesives, such as catalysts, fillers, pigments, dyes, fungicides, bacteriocides, stabilizers, antioxidants and cure-control additives, if desired.

In order to practice the present invention, the first component of this invention is prepared by thoroughly mixing the aminoxysilicon compound (II) with the PSA (I) such that the aminoxysilicon compound constitutes from about 1 to 20 percent of the total weight of (I) plus (II), on a solids basis. Preferably, the aminoxysilicon compound constitutes from 1 to 10 percent by weight of (I) plus (II).

In a similar manner, the second component of this invention is prepared by thoroughly mixing a curing amount of the amidosilicon compound (IV) with the PSA (III). By "curing amount" it is meant at least an amount sufficient to improve the adhesion between the two components as demonstrated by an increase in bond strength and/or increased cohesive failure versus the unmodified PSA. Thus, the amount of amidosilicon compound employed will vary according to the nature of the PSA, amount of the aminoxysilicon compound incorporated therein and the particular amidosilicon compound selected. Typically, this will vary from about 0.1 to about 10 percent by weight of the amidosilane based on the total weight of the amidosilicon compound (IV) plus the PSA (III), on a solids basis.

The compositions of the present invention, in which the aminoxysilicon compound (II) is incorporated in a PSA (I), and in which the amidosilicon compound (IV) is incorporated in a PSA (III), are thus employed as intermediates in the method of the present invention.

Those skilled in the art will readily arrive at optimum formulations by routine experimentation. For example, when the PSA is selected from the preferred systems based on acrylic or styrene-butadiene rubber, from about 1 to 10 percent by weight of the preferred aminoxysilicon compound of formula (ii), above, are effectively employed in the first PSA component and from about 0.1 to 10 percent by weight of methylvinyldi-(N-methylacetamido) silane are employed in the second PSA component. As mentioned above, however, the maximum aminoxysilicon compound content and amidosilicon compound content in the two components is limited by compatibility considerations and these ingredients must not separate from the PSA matrix to form their own macroscopic phases. It is, of course, recognized that separate phases may exist at a microscopic level.

As will be readily recognized by those skilled in the art, the PSAs of the present invention may be supplied as a solution or dispersion in an inert organic solvent. By inert it is meant that the solvent does not react with any of the other ingredients of the present invention. The particular solvent selected will generally depend upon the PSA employed. Thus, for a non-polar PSA such as a silicone or a butyl rubber, a non-polar solvent such as toluene, hexane, cyclohexane, mineral spirits or xylene would be appropriate. For a polar PSA such as a urethane or acrylonitrile, a polar solvent such as acetone, ethyl acetate, tetrahydrofuran or dimethylformamide might be used. In general, the PSAs contemplated in the present invention are prepared and marketed in such solvent form and are well known in the art.

Any conventional mixing method may be used to mix the ingredients of the above described components. For example, when the PSA is supplied in solution, relatively low shear mixers such as low speed blade mixers or Pfaudlers may be used. When an all-solids PSA is to be used according to the methods of the present invention, a high intensity mixer, such as a Banbury or roll mill, should be used to insure good dispersion of the ingredients. As far as is known, the order of mixing is not critical to the operability of this invention as long as the aminoxysilicon compound and the amidosilicon compound are thoroughly dispersed in the respective PSA.

After the above described first and second components are prepared, said components are contacted in the method of this invention to form a pressure-sensitive adhesive construction. Ordinarily, each component is coated onto a substrate before the contacting step is executed. Thus, this well known method in the art can be practiced using the components disclosed herein by first coating a backer, such as a plastic or metallic film or tape, with the first component of this invention and contacting the resulting composite with the surface of a solid substrate, such as a metal or plastic, which was previously coated with the second component of the present invention. It is also contemplated that a free film of the first and second components of the present invention may be prepared by coating each component onto a release liner as is commonly practiced in the art in certain bonding operations.

To form such coatings on substrates, solvent-based compositions of this invention can be diluted with a sufficient quantity of a good solvent for the respective components in order to provide a desired coating consistency. As described above, such solvents as hexane, heptane, toluene, xylene, mineral spirits or ketones are suitable for this purpose, the exact choice being based on the nature of the PSAs involved, as is commonly practiced in the art. Coatings of such solvent-based first and second components may be applied to substrates by any of the methods commonly practiced in the coating arts. For example, they may be dipped, brushed, flow coated, blade coated or gravure coated onto a substrate. After coating the backer or solid substrate with the PSA composition, solvent is generally removed by evaporation at ambient temperature or by heating, as commonly practiced in the art. Alternatively, 100% solids coatings are also contemplated herein. These may be applied to a substrate by, e.g., a calendaring operation or one of the above mentioned techniques if the viscosity is low enough.

Those skilled in the art will recognize that both the aminoxysilicon compound (II) as well as the amidosilicon compound (IV) react with water. It is therefore preferred to store the PSA components containing these ingredients in a dry (e.g., hermetically sealed) condition till they are to be contacted by the method of the present invention.

The constructions of the present invention may be used in many of the applications currently being served by the PSAs described above (i.e., ingredient I of the present invention). With the constructions of the present invention, however, the adhesion is improved and, with the passage of time, the adhesive bond formed between the first and second components will generally increase in strength. This permanent set aspect of the present invention is, of course, an advantage in many applications wherein a strong bond, rather than reversibility thereof, is of primary importance. Such applications include bonding of automotive and decorative trim, permanent fastening devices such as picture hooks, contact paper and labels, electronic component assembly, substrate lamination (e.g., metals, paper, plastic, floor tiles, carpeting), and the like.

EXAMPLES

The following examples are presented to further illustrate the compositions and methods of this invention, but are not to be construed as limiting the invention, which is delineated in the appended claims. All parts and percentages in the examples are on a weight basis and all are reported on a solids basis unless indicated to the contrary.

The following materials were used to prepare the constructions of the present invention as well as comparative constructions:

CROSSLINKER A is an aminoxy-functional silicone consisting essentially of an N,N-diethylaminoxypolysiloxane having the formula

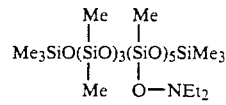

wherein Me and Et hereinafter denote methyl and ethyl radicals, respectively.

SILANE B is a silane consisting essentially of methylvinyldi-N-methylacetamidosilane having the formula

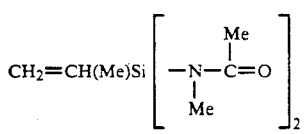

MTO is a methyl trioximosilane having the structure

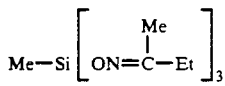

PDMS is a hydroxyl endblocked polydimethylsiloxane fluid having a viscosity of about 40 cS at 25° C.
DBTDA is dibutyltin diacetate.

EXAMPLES 1-2

An acrylic pressure-sensitive adhesive (PSA) solution, 76 RES 9105, was modified to form the constructions of the present invention. 76 RES 9105 (Unocal Chemicals Division, Schamburg, Ill.) is described as a high performance "self-crosslinking" pressure sensitive adhesive which is a 45% solids solution of an acrylic resin polymer in an oxygenated hydrocarbon solvent blend. A first component was prepared by thoroughly mixing the indicated amount of CROSSLINKER A with this PSA (see Table 1). A second component was prepared by thoroughly mixing SILANE B with another portion of the PSA solution, also indicated in Table 1. Each of these components was then applied to 5 mil aluminum foil, dried to form a 2 mil-thick film thereon and the coated foil was cut into 1 inch-wide strips. The foil strips bearing the first and second PSA adhesive films were pressed together using a 10 pound steel roller at room temperature to form a lap joint having a ½ inch overlap (i.e., a total of ½ square inch contact surface). The same procedure was followed in the preparation of (Comparative) Example 1, which served as a control and contained no additives in either PSA layer. The lap joints were aged at room temperature for various periods and then tested (at room temperature using a pull rate of ½ inch/minute) to determine shear adhesive strength. Results are presented in Table 1, wherein the shear strength is reported in pounds per square inch (psi).

TABLE 1

| | (Comparative) Example 1 | Ex. 2 |
|---|---|---|
| % CROSSLINKER A in first component (solids basis) | — | 5.7 |
| % SILANE B in second component (solids basis) | — | 3.2 |
| Shear Adhesion (psi) After: | | |
| 1 hour | 66 | 59 |
| 1 day | 60 | 86 |
| 2 days | 63 | 73 |
| 7 days | 64 | 84* |

TABLE 1-continued

| | (Comparative) Example 1 | Ex. 2 |
|---|---|---|
| 28 days | 69 | 93 |

*Aluminum foil tore; actual shear strength greater than indicated.

EXAMPLES 3-4

A styrene-butadiene rubber based PSA solution, DURO-TAK 36-6045, was modified and tested according to the procedures of Example 2, as shown in Table 2. DURO-TAK 36-6045 (National Starch and Chemical Corp., Bridgewater, N.J.) is described as a 48% solids solution in toluene, heptane and isopropyl alcohol having a viscosity of about 5,500 cP at 25° C. Again, a control construction (Comparative Example 3) was prepared to illustrate the unmodified styrene-butadiene PSA. Shear adhesion results are shown in Table 2, wherein a one inch overlap was used in the case of the control construction.

TABLE 2

| | (Comparative) Example 3 | Example 4 |
|---|---|---|
| % CROSSLINKER A in first component (solids basis) | — | 5.7 |
| % SILANE B in second component (solids basis) | — | 3.2 |
| Shear Adhesion (psi) After: | | |
| 1 hour | 7 | 98* |
| 1 day | 10 | 87* |
| 2 days | 11 | 93* |
| 7 days | 9 | 89* |
| 28 days | 9 | 89* |

*Aluminum foil tore; actual shear strength greater than indicated.

EXAMPLES 5-9

The 76 RES 9105 acrylic pressure-sensitive adhesive solution, described above, was modified to form the PSA constructions shown in Table 3. These constructions were tested as described in Examples 1-2 with the exception that 5 mil thick stainless steel foil was use instead of the aluminum foil.

TABLE 3

| | (Comparative) Ex. 5 | Ex. 6 | Ex. 7 | Ex. 8 | Ex. 9 |
|---|---|---|---|---|---|
| % CROSSLINKER A first component (solids basis) | 20 | 20 | 10 | 1.0 | 1.0 |
| % SILANE B second component (solids basis) | 0.1 | 10 | 1.0 | 10 | 0.1 |
| Shear Adhesion (psi) After: | | | | | |
| 1 hour | 24 | 63 | 38 | 181 | 141 |
| 1 day | 36 | 101 | 55 | 239 | 148 |
| 2 days | 43 | 84 | 48 | 107 | 132 |
| 7 days | 59 | 113 | 94 | 156 | 117 |
| 28 days | 57 | 92 | 115 | 112 | 136 |

(Comparative) Example 5 in Table 3 illustrates the reduced adhesive strength obtained when there was an improper balance between CROSSLINKER A and SILANE B for this particular acrylic PSA.

EXAMPLE 10

The above described DURO-TAK 36-6045 styrene-butadiene rubber PSA was modified as shown in Table 4, wherein shear adhesion test results using the 5 mil thick stainless steel foil as the substrate are also reported.

TABLE 4

|  | Example 10 |
|---|---|
| % CROSSLINKER A in first component (solids basis) | 6.7 |
| % SILANE B in second component (solids basis) | 4.2 |
| Shear Adhesion (psi) After: | |
| 1 hour | 76 |
| 1 day | 164 |
| 2 days | 194 |
| 7 days | 125 |
| 28 days | — |

It is seen from the above Tables that the PSA constructions of the present invention provide improved shear adhesive strength versus unmodified acrylic and styrene-butadiene systems.

(COMPARATIVE) EXAMPLE 11

A first component of the DURO-TAK 36-6045 styrene-butadiene rubber PSA was modified with 5.0 percent of MTO and a second component of this PSA was modified with a mixture of 9.0 percent of polydimethylsiloxane and 1.0 percent of DBTDA according to the above procedures. Shear adhesion testing results, using the 5 mil thick aluminum foil as the substrate, are presented in Table 5.

TABLE 5

| | Shear Adhesion (psi) |
|---|---|
| After: | |
| 1 hour | 17 |
| 1 day | 18 |
| 2 days | 20 |
| 7 days | 22 |
| 28 days | 17 |

It is known in the silicone sealants art that compositions containing the above ingredients (i.e., the MTO, PDMS and DBTDA) would cure at room temperature. Nevertheless, the modification of the above PSA with these materials did not improve the shear strength as much as did the modifications according to the present invention.

Similar attempts to modify an acrylic PSA, with MTO in the first component and the PDMS and DBTDA in the second component, were also ineffective.

EXAMPLE 12

The above described styrene-butadiene rubber PSA was modified by incorporating 6.7% of CROSSLINKER A in the first component and 4.2% of SILANE B in the second component, as described in Example 10. The modified PSA components were coated onto 5 mil thick stainless steel foil. The effect of relative humidity on adhesion performance was evaluated by exposing the coated steel foils to (a) 100% relative humidity (R.H.) at 60° C.: (b) essentially 0% R.H. at room temperature; and (c) ambient conditions. After storage for the times indicated in Table 6, the components were pressed together for one hour and shear tested using a one inch overlap.

TABLE 6

| Storage Condition | Storage Time | Shear Strength (psi) |
|---|---|---|
| 100% R.H. | 1 day | 154 |
| " | 7 days | 147 |
| " | 14 days | 105 |
| " | 28 days | 115 |
| 0% R.H. | 1 day | 252 |
| " | 7 days | 231 |
| " | 14 days | 264 |
| " | 28 days | 281 |
| Ambient | 1 hour | 76 |

It is seen from Table 6 that exposure of the coated PSA foils of the present invention to high humidity reduces ultimate shear adhesion, but the bond strength is still quite high. Furthermore, the coated foils retained their tack after storage at the high humidity.

We claim:

1. A composition consisting essentially of:
(I) a pressure-sensitive adhesive selected from those based on acrylic, styrene-butadiene, acrylonitrile-butadiene, polyisobutylene, isoprene, isoprene-isobutylene, chloroprene, polyvinylether, chlorinated or polyurethane rubber; and
(II) an aminoxysilicon compound having the structure

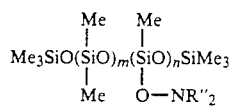

wherein Me denotes a methyl radical, R'' is independently selected from the group consisting of methyl and ethyl radicals, m is 1 to about 5,000 and n is 2 to about 50, said aminoxysilicon compound constituting from about 1 to 20 percent of the total weight of said ingredients (I) and (II).

2. The composition of claim 1, wherein m of said aminoxysilicon compound is 1 to 100 and n of said aminoxysilicon compound is 2 to 10.

3. The composition of claim 2, wherein said pressure-sensitive adhesive is based on a rubber selected from the group consisting of acrylic and styrene-butadiene polymers.

4. The composition of claim 3, wherein said aminoxysilicon compound (II) has the structure

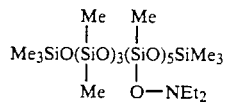

in which Me and Et denote a methyl and an ethyl radical, respectively.

* * * * *